July 31, 1956 F. H. MUELLER ET AL 2,756,936
RELIEF VALVE
Filed Jan. 21, 1952 2 Sheets-Sheet 1
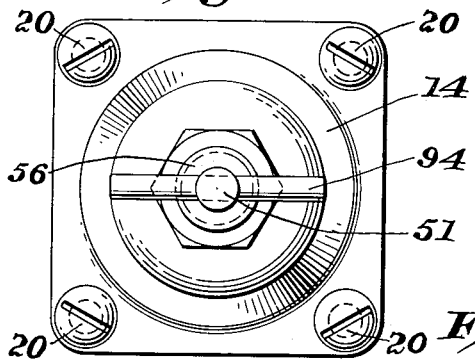
Fig. 1.
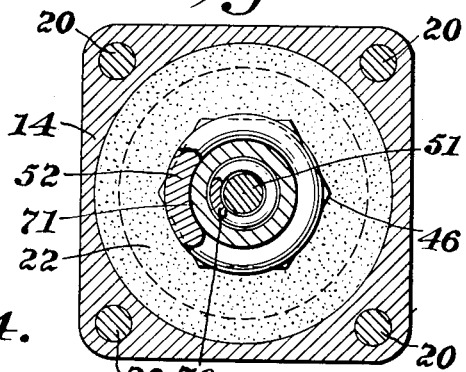
Fig. 3.
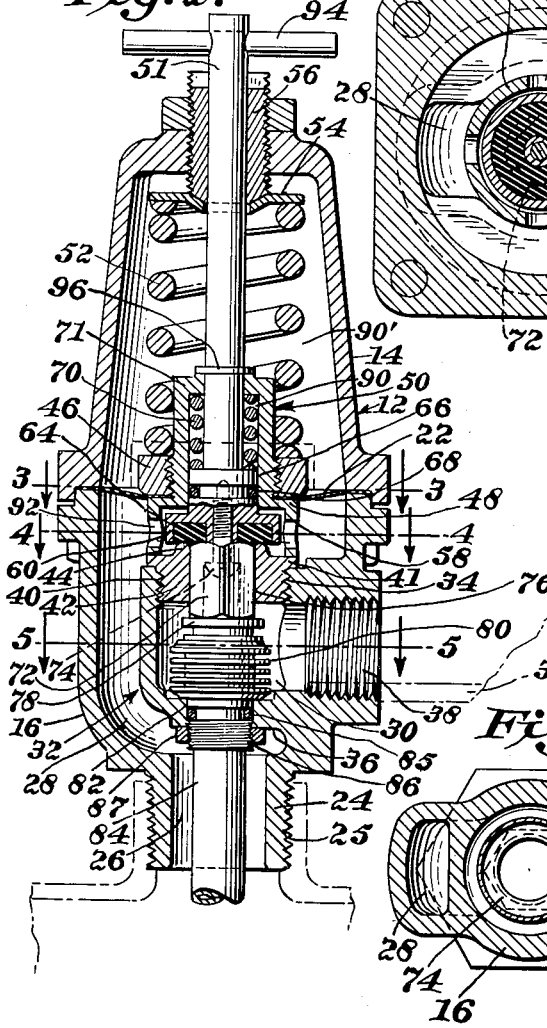
Fig. 2.
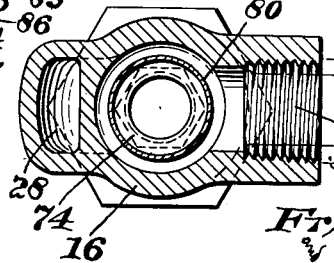
Fig. 4.
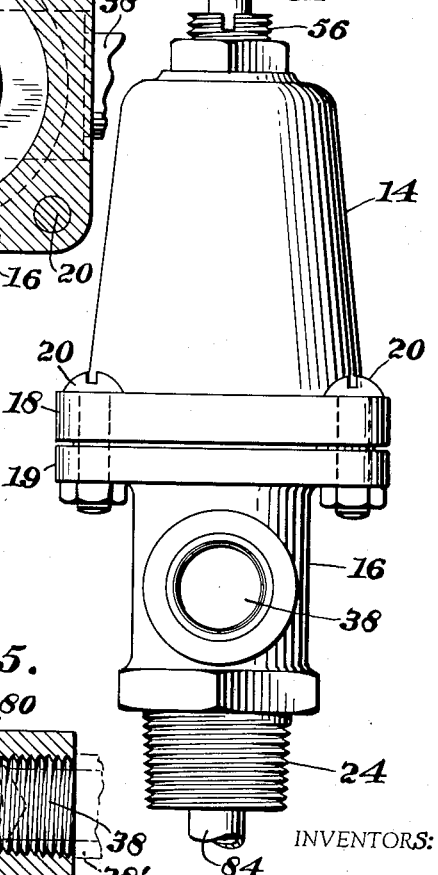
Fig. 6.
Fig. 5.
INVENTORS:
Frank H. Mueller,
Earl E. Tinker,
BY Cushman, Darby & Cushman
ATTORNEYS.

July 31, 1956 F. H. MUELLER ET AL 2,756,936
RELIEF VALVE
Filed Jan. 21, 1952 2 Sheets-Sheet 2
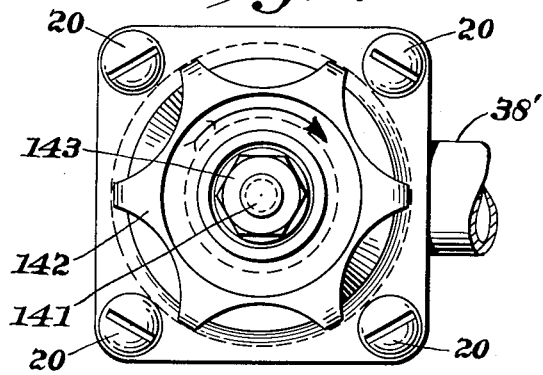
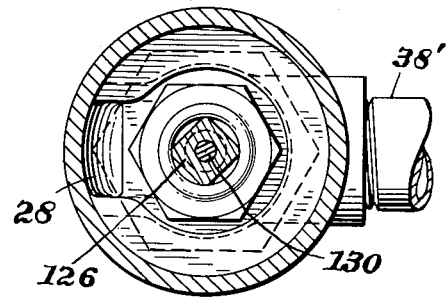
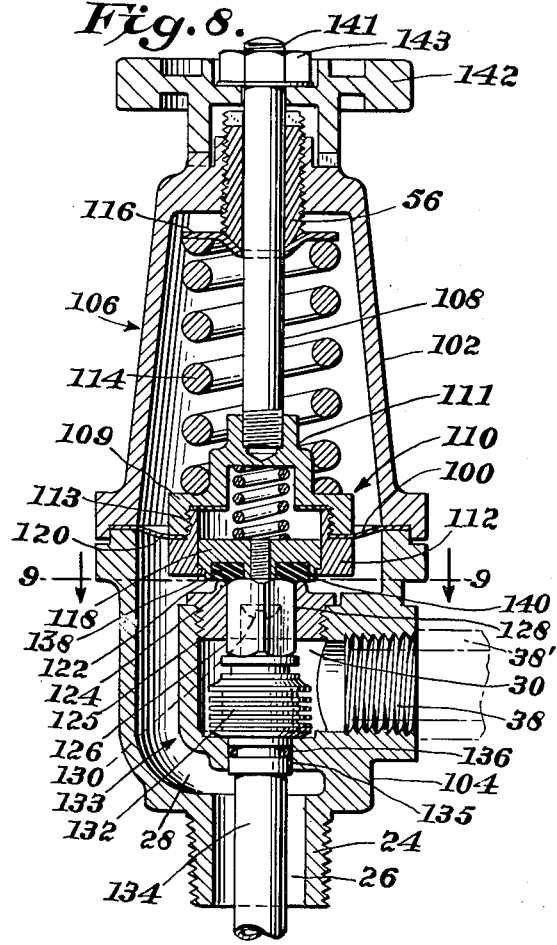
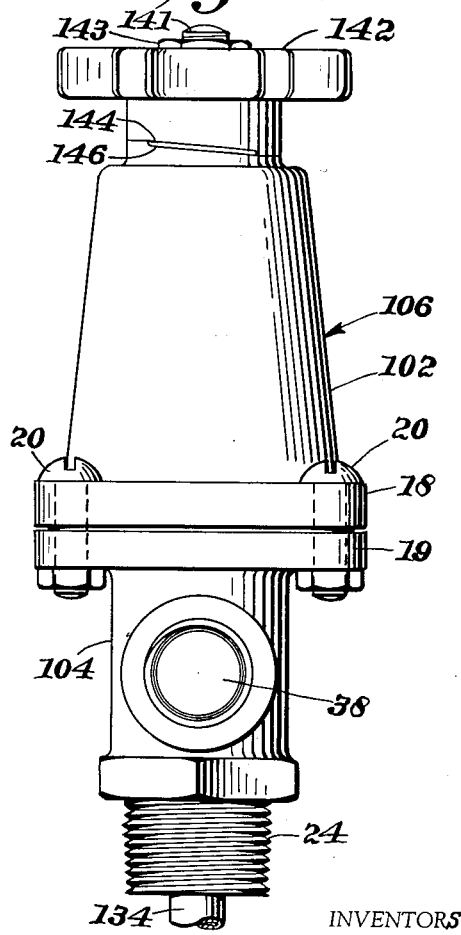
INVENTORS:
Franklin H. Mueller,
& Earl E. Tinker,
BY Cushman, Darby & Cushman
ATTORNEYS.

United States Patent Office 2,756,936
Patented July 31, 1956

2,756,936

RELIEF VALVE

Frank H. Mueller and Earl E. Tinker, Decatur, Ill., assignors to Mueller Co., Decatur, Ill., a corporation of Illinois Application January 21, 1952, Serial No. 267,338

8 Claims. (Cl. 236—92)

The present invention relates to a new and improved temperature and pressure relief valve for fluid supplying heating systems and the like.

An important object of the present invention is to provide a quick opening temperature relief valve of the automatic or re-seating type which is more positive and accurate in operation than valves heretofore available, and which permits complete replacement of all the working parts through the top of the valve body without the necessity of disconnecting the valve body from the tank, boiler or other fluid heating system with which it is associated.

A further important object is to provide a quick opening temperature relief valve of the reseating type in combination with the advantages associated with a pressure operated diaphragm type valve.

A further object is to provide means to prevent imposing an overloading pressure by the valve against its seat when the valve is moved to its closed position by counterbalancing the pressure supplied to close the valve by an opposing pressure sufficient to prevent severe embedding of the valve.

The commonly used beaded valve seat when associated with a composition member or washer on the face of the valve is the most positive and efficient of any known type of seat, and requires less pressure to maintain closed as long as it is kept clean and free of foreign matter. Very little embedding will take place if the closing force or pressure is only equal to or, at the most, slightly in excess of the force required to effect a pressure seal. In a temperature relief valve embedding of the seat is objectionable since it not only increases the tendency to trap foreign matter on the seating surface, but also permits the seat to change its position, and hence change the temperature at which the valve operates.

Another important feature of the present invention is the provision of a relief valve having a contacting surface of suitable, durable composition material and which is arranged to be moved into contact with a beaded valve seat so as to provide an effective seal without danger of being severely embedded into the seat.

A still further object is to provide a relief valve wherein the temperature responsive element is disposed in the outlet chamber away from contact with the heated fluid and the corrosive effect of such fluids, but having means for transmitting the heat from the inlet chamber to the temperature responsive element disposed in the outlet chamber.

A further object is to provide a valve of the type to be hereinafter described wherein the valve may be opened for temperature relief and pressure relief independently of each other.

Other objects and advantages of the invention will become apparent from the following description when taken in conjunction with the accompanying claims and drawings.

Referring now to the drawings in more detail,

Figure 1 is a top plan view of the valve shown in Figure 2;

Figure 2 is a vertical sectional view of one form of relief valve according to the present invention;

Figure 3 is a horizontal sectional view taken substantially along the line 3—3 of Figure 2;

Figure 4 is a horizontal sectional view taken substantially along the line 4—4 of Figure 2;

Figure 5 is a horizontal sectional view taken substantially along the line 5—5 of Figure 2;

Figure 6 is an end view of the valve shown in Figure 2;

Figure 7 is a top plan view of the modified relief valve shown in Figure 8;

Figure 8 is a vertical sectional view of a modification of the relief valve shown in Figure 2;

Figure 9 is a horizontal sectional view taken substantially along the line 9—9 of Figure 8; and Figure 10 is an end view of Figure 8.

Referring now in more detail to the valve shown in Figures 1 to 6, reference numeral 12 generally designates an outer valve housing comprising an outer top part 14 and a lower outer part 16 with opposed circular flanges 18 and 19 secured together by bolts 20 and clamping between them a diaphragm 22.

The lower part of the housing 16 has a depending outwardly threaded neck portion 24 provided with external threads 25 for mounting of the valve as a whole in use. Neck portion 24 defines inlet port 26.

The interior of the lower housing 16 is divided into an inlet chamber 28 and an outlet chamber 30 by means of a generally cylindrical partition portion 32 which is spaced from the adjacent wall of the lower chamber 16. The partition 32 is completed by the top and bottom transverse partitions 34 and 36, so that in conjunction with the diaphragm 22 there is provided the inlet chamber 28 and the outlet chamber 30. Outlet port 38 communicates with the outlet chamber 30 and is provided to discharge waste water through the pipe 38', shown in broken lines in Figure 2.

The inner partition 32 is provided with the threaded bore 40 at its upper free end. Threaded in the bore 40 is a seat ring member 42 which provides a beaded valve seat 44 faced toward the diaphragm 22.

The diaphragm is provided with an inner opening substantially medially thereof having its margins clamped between the clamping ring 46 and the surface 48 of the valve receiving housing 50 disposed on the lower end of the valve stem 51. Clamp ring 46 constitutes a nut threaded on the outside of the valve receiving housing 50 so as to abut the surface 48 of the valve housing when in its threaded position.

A compression spring 52 surrounds the valve receiving housing 50 and the valve stem 51 and bears against the clamping ring nut 46 at its lower end. The upper end of the spring 52 bears against an abutment 54 which is supported by hollow screw 56, which is engaged in a threaded bore of the upper housing portion 14. The action of spring 52 is limited by the abutment of the lower portion 58 of the valve receiving housing 50 against the flange portion 41 of the valve seat ring 42.

Secured to the lower end of valve stem 51 is a valve 60 which is faced with resilient composition material as shown at 64. The neck portion 66 of valve 60 is slidably mounted within the valve receiving housing 50 and is of a cross-sectional area substantially equal to that circumscribed by the seat 44. The neck portion 66 is grooved adjacent its upper end to receive a sealing member 68 which is preferably of the O-ring type. A relatively light spring 70 surrounds the valve stem from its point of attachment to the valve 60 within the valve receiving housing. The spring 70 abuts the upper surface margins of the neck 66 of the valve 60 at its lower end and is held by the transverse portion 71 of the valve receiving housing 50 at its upper end. When valve 60 is raised for temperature relief in the manner to be hereinafter described, it must only overcome the force of spring 70, which urges valve 60 toward the beaded ring seat 44.

A polygonal guide member 72 depends from the lower face of the valve 60 and is secured thereto by means of the recessed screw shown at 74.

Guide member 72 extends through the valve opening 76 provided in the valve seat ring 42 to a point of contact with the upstanding boss 78 which is integral with the thermal responsive device 80, which may be of the Sylphon bellows type, and is disposed in the outlet chamber 30 beneath the valve opening 76. The thermal device 80 seats against the transverse portion 36 of the partition 32. A second opening 82 is provided in the transverse portion 36 of partition 32 to permit passage of the lower depending tubular portion 84 which is integral with the thermal device 80 and which extends into the inlet chamber 28 and down into the inlet opening 26, and is designed to further extend into the tank or system with which it is to be used. The tubular extension 84 is provided with a groove to receive the circular sealing member 85 at its point of passage through the opening 82, and which is again preferably of the O-ring type. Tubular extension 84 is provided with the threads 86 at its point of passage through the opening 82 to receive a lock nut 87 which rigidly secures the tubular extension 84 and the associated thermal responsive device 80 to the horizontal partition portion 36. Tubular extension 84 is closed by crimping or soldering at its lower free end (not shown).

The areas 90 and 90' within the outer valve housing 14 and valve receiving housing 50 are not subjected to system pressure, but only to atmospheric pressure. As previously mentioned, the valve receiving housing 50 is provided with a lower flared portion 58 which receives the diaphragm 22 against its upper surface with its free lower ends being designed to abut the flange portion 41 of the valve seat ring to limit the downward movement of the valve housing responsive to the action of spring 52. In order to permit the waste of fluid through the valve opening 76 in response to temperature conditions, a series of openings or ports 92 is provided in the lower skirt portion 58, so that fluid may be discharged from the inlet chamber 28 upon expansion of the thermal device 80 to open valve 60.

Valve stem 51 is provided with the crosspiece 94 in order that valve 60 may be test lifted. A stop 96 on the valve stem 51 is provided, so that valve 60 will be lifted from its seat when the diaphragm 22 is raised together with valve receiving housing 50 responsive to excessive pressure conditions in the inlet chamber 28.

From the foregoing construction, it will be seen that the outer ends of the valve stem 51 and the neck 66 are subject only to atmospheric pressure so that in effect, the valve 60 has an area (which can be termed a pressure-subject area) that is exposed to atmospheric pressure and is opposite and substantially equal to the area on the underside of the valve washer 64 that is exposed to atmospheric pressure in the valve port 76. In other words, the net surface area of the valve 60 acted on by fluid pressure in the inlet chamber 28 to urge the valve to seat or unseat is zero. Consequently, the valve seating force is effected only by the spring 70 and is unaffected by variations in inlet chamber pressure, so that the seating force can be set to an optimum which will effect a seal without undue imbedding of the bead seat 44 in the washer 64.

In operation, the valve will be mounted to a tank or other heating system with which such valves are commonly used by means of the threaded neck portion 25 with tubular extension 84 extending into the inlet chamber and into the tank or device with which the valve is to be used. Tubular extension 84 communicates with the bellows 80 and both are filled with a thermal responsive fluid, so that when temperature conditions reach a previously determined danger point bellows 80 will expand against the guide member 72 associated with the valve 60 to unseat the valve to permit the waste of fluid through the openings 92 through the channels formed by the polygonal guide 72 down over the bellows 80 and out the waste or outlet port 38. The position of the bellows 80 in the outlet chamber beneath the valve seat opening also acts to deflect the waste fluid out the outlet opening 38. It will be observed that valve 60 need only act against the force of spring 70 for temperature relief. When pressure conditions within inlet chamber 28 reach the predetermined danger point, the diaphragm 22 is lifted to raise the valve receiving housing 50 against stop 96, which again raises valve 60 from its seat to permit waste of fluid pressure. It will be observed that this arrangement provides a simple, efficient, quick-opening valve for both temperature and pressure relief having decided advantages over the valves of this type formerly employed.

Figures 7 to 10 represent a modification of the valve disclosed in Figures 1 to 6. Only those parts which have been changed over those described in connection with Figures 1 to 6 will be described in detail, since otherwise the structure is substantially identical with that shown and described in connection with Figure 2.

A suitable outer housing and inlet and outlet ports are provided identical with those described in connection with Figures 1 to 6. In this modification pressure relief is provided for by means of the diaphragm 100 which is clamped between the upper and lower portions 102 and 104 of the outer valve housing 106. The valve stem 108 is threaded at its lower end to the neck portion 111 of valve receiving housing 110. The valve receiving housing 110 is completed by the lower section 112 comprising a clamping ring which is screw threaded to the upper section 109, as seen at 113, so as to clamp the margins of the medial opening in diaphragm 100 therebetween in the manner previously described. The relatively heavy spring 114 surrounds the valve stem 108 and abuts at its lower end against the top of the valve receiving housing 110 and at its upper end against the abutment 116. Valve 118 is slidably disposed, without a fluid seal, within the valve receiving housing 110 and is actuated toward a valve seat by means of a second light coil spring 120 disposed within the valve receiving housing 110. Valve 118 is provided with an insert of resilient composition material 122 on its underface to contact the beaded portion 124 of the valve seat ring 125.

A polygonal guide member 126 extends through the valve opening 128 in the valve seat ring 125. Guide 126 is secured to the face of the valve 118 by means of the recessed screw 130, as previously described. The guide 126 abuts the thermal responsive bellows 132 also in the manner previously described.

The depending tubular portion 134 extends through a lower opening 135, substantially equal in cross-sectional area to that circumscribed by the bead seat 124, in the inner partition 133 which forms the inlet and outlet chambers referred to. At its point of passage, the tubular extension 134 is provided with a sliding sealing member 136 which is preferably of the O-ring type, and in this modification the bellows 132 and associated tubular portion 134 are capable of bodily axial movement in response to pressure of the system.

In the construction of this modification, because there is no seal between the valve 118 and its housing 110, the upper surface of valve 118 is exposed to the fluid pressure of the system. This seating pressure is counterbalanced, however, by system pressure acting on the undersurface of the valve radially outwardly of the valve seat and system pressure acting on the tubular portion 134 to move the bellows bodily in a direction to unseat the valve, so that valve 118 is subjected substantially only to the loading force of spring 120 when in use and when in storage. Again, it will be seen that there is a pressure-subject area, i. e., the cross-sectional area of the tubular portion 134 where it passes through the opening 135, which counterbalances any seating force on the valve 118 effected by inlet chamber pressure. The operation of the valve in response to excessive temperature conditions is the same as that described in connection with Figures 1 to 6, with the exception that clamping ring 112 does not abut valve seat ring 125 and hence the ports 92 of Figure 2 are dispensed with.

Responsive to excessive pressure conditions in the system, the diaphragm 100 will be raised to effect raising of the valve 118. Valve 118 is lifted from its seat by the upward motion of the diaphragm 100 and valve receiving housing 110 when the ledge 138 of the clamping ring 112 contacts the indented area 140 on valve 118.

Valve stem 108 is threaded on its upper free end as shown at 141 to receive the nut 143 which secures the hand gripping handle 142 to the valve stem.

When it is desired to test lift this modified valve structure 118, the handle 142 is turned in the manner common to household faucets, and the opposed cam surfaces 144 and 146 integral with the handle 142 and the valve housing 102, respectively, cooperate to raise the stem 108, associated valve receiving housing 110, and the valve 118 by means of the abutment 138 in the manner previously described.

It will be observed, therefore, that in both forms of the valve, an extremely reliable and durable valve is provided for both temperature and pressure relief. The disclosure herein is given as illustrative of the invention and is susceptible of variations in the form and relationship of parts within the scope of the claims which follow.

We claim:

1. A relief valve comprising: a housing having an inlet and an outlet; partition means dividing the interior of said housing into an inlet chamber and an outlet chamber; a flow port in said partition means leading from said inlet chamber to said outlet chamber, said partition means having an opening therein spaced from and aligned with said flow port and extending between said inlet and said outlet chambers; a valve seat at the inlet end of said flow port; a reciprocating valve member seatable on said seat; means yieldingly urging said valve member to seat; an expansible thermal-responsive device mounted in said outlet chamber in alignment with said flow port for unseating engagement with said valve member on expansion of said device; a tubular extension member on said thermal-responsive device sealingly extending through said partition opening into said inlet chamber; a flexible diaphragm forming a wall of said inlet chamber opposed to said valve seat, the outer side of said diaphragm being exposed to atmosphere; means yieldingly urging said diaphragm inwardly of said inlet chamber; means for engaging and unseating said valve member upon movement of said flexible diaphragm outwardly of said inlet chamber; and means for substantially counterbalancing the seating and unseating forces on said valve member effected by fluid pressure in said inlet chamber, said means including a pressure-subject surface on one of said members having an effective area substantially equal to that circumscribed by said valve seat.

2. The structure defined in claim 1 in which the counterbalancing means includes: an extension on said valve member sealingly extending through an opening in said diaphragm, the cross-sectional area of said diaphragm opening being substantially equal to the area circumscribed by the valve seat; and means fixing the tubular extension against longitudinal movement in the partition opening.

3. The structure defined in claim 1 in which the partition opening is of substantially the same cross-sectional area as the area circumscribed by the valve seat and the counterbalancing means includes: means slidably mounting the tubular extension in said partition opening; and means for exposing the entire surface area of the valve member, less the surface area thereof circumscribed by the valve seat, to inlet chamber pressure.

4. A relief valve comprising: a sectional housing having a bonnet and a base provided with an inlet and an outlet; a flexible diaphragm clamped between said base and said bonnet; partition means in said base dividing the interior thereof into an outlet chamber and, together with said diaphragm, an inlet chamber; a flow port in said partition means opposite said diaphragm leading from said inlet chamber to said outlet chamber, said partition means having an opening therein spaced from and aligned with said flow port and extending between said inlet and said outlet chambers; a valve seat at the inlet end of said flow port; a tubular valve guide secured centrally to said diaphragm and providing an opening therethrough of substantially the same cross-sectional area as the area circumscribed by said valve seat; a reciprocating valve member seatable on said seat and having an extension slidably and sealingly mounted in said valve guide; means in said valve guide yieldingly urging said valve member to seat; means within said bonnet yieldingly urging said diaphragm inwardly of said inlet chamber; means for engaging and unseating said valve member upon movement of said diaphragm outwardly of said inlet chamber; an expansible thermal-responsive device mounted in said outlet chamber in alignment with said flow port for unseating engagement with said valve member on expansion of said device; and a tubular extension on said device sealingly fixed in and extending through said partition opening into said inlet chamber.

5. The structure defined in claim 4 in which the diaphragm-movement unseating means includes: a stem on said valve member extending through said bonnet for access exteriorly thereof; and a collar on said stem engageable by said valve guide.

6. A relief valve comprising: a sectional housing having a bonnet and a base provided with an inlet and an outlet; a flexible diaphragm clamped between said base and said bonnet; partition means in said base dividing the interior thereof into an outlet chamber and, together with said diaphragm, an inlet chamber; a flow port in said partition means opposite said diaphragm leading from said inlet chamber to said outlet chamber, said partition means having an opening therein spaced from and aligned with said flow port and extending between said inlet and said outlet chambers; a valve seat at the inlet end of said flow port, said partition opening being of substantially the same cross-sectional area as the area circumscribed by said valve seat; a reciprocating valve member seatable on said seat; a valve guide secured centrally to said diaphragm and having a recess therein slidably receiving said valve member; means within said valve guide yieldingly urging said valve member to seat; means within said bonnet yieldingly urging said diaphragm inwardly of said inlet chamber; means for engaging and unseating said valve member upon movement of said diaphragm outwardly of said inlet chamber; an expansible thermal-responsive device mounted in said outlet chamber in alignment with said flow port for unseating engagement with said valve member on expansion of said device; and a tubular extension on said thermal-responsive device sealingly and slidably extending through said partition opening into said inlet chamber.

7. The structure defined in claim 6 in which the unseating means includes: means defining a peripheral shoulder on the valve member facing toward the valve seat; and an interior peripheral flange on the valve guide engageable with said shoulder.

8. The structure defined in claim 6 including a test rod secured to the valve guide and extending through the bonnet for access exteriorly thereof.

References Cited in the file of this patent

UNITED STATES PATENTS

| | | |
|---|---|---|
| 2,047,722 | Work | July 14, 1936 |
| 2,486,644 | Grosboll | Nov. 1, 1949 |
| 2,497,201 | Banner | Feb. 14, 1950 |
| 2,642,229 | Mueller et al. | June 16, 1953 |